United States Patent
Eckert et al.

(10) Patent No.: US 9,100,889 B2
(45) Date of Patent: Aug. 4, 2015

(54) METHODS FOR SIGNALING AND DETERMINING THE TIME OF THE BEGINNING OF A MEASUREMENT TIME INTERVAL, COMMUNICATION DEVICE AND COMMUNICATION NETWORK ELEMENT

(75) Inventors: Michael Eckert, Braunschweig (DE); Andreas Schmidt, Braunschweig (DE); Achim Luft, Braunschweig (DE)

(73) Assignee: Intel Mobile Communications GmbH, Neubiberg (DE)

(*) Notice: Subject to any disclaimer, the term of this patent is extended or adjusted under 35 U.S.C. 154(b) by 1166 days.

(21) Appl. No.: 11/928,556

(22) Filed: Oct. 30, 2007

(65) Prior Publication Data

US 2009/0111383 A1    Apr. 30, 2009

(51) Int. Cl.
 *H04B 17/00* (2006.01)
 *H04B 7/00* (2006.01)
 *H04W 36/30* (2009.01)
 *H04B 17/309* (2015.01)

(52) U.S. Cl.
 CPC ............. *H04W 36/30* (2013.01); *H04B 17/309* (2015.01)

(58) Field of Classification Search
 USPC .............. 455/67.11, 405, 231; 370/252
 See application file for complete search history.

(56) References Cited

U.S. PATENT DOCUMENTS

| | | | |
|---|---|---|---|
| 6,470,006 B1* | 10/2002 | Moulsley | 370/347 |
| 6,845,238 B1* | 1/2005 | Muller | 455/436 |
| 7,016,320 B1* | 3/2006 | Petersson et al. | 370/331 |
| 7,626,936 B1* | 12/2009 | Golan et al. | 370/237 |
| 7,743,139 B1* | 6/2010 | Golan et al. | 709/224 |
| 2003/0036397 A1* | 2/2003 | Takahashi | 455/502 |
| 2004/0047312 A1* | 3/2004 | Muszynski et al. | 370/331 |
| 2005/0111415 A1* | 5/2005 | Soomro et al. | 370/338 |
| 2005/0227732 A1* | 10/2005 | Hiraki | 455/561 |
| 2006/0104218 A1* | 5/2006 | Kako | 370/252 |
| 2006/0205406 A1* | 9/2006 | Pekonen et al. | 455/436 |
| 2007/0076644 A1* | 4/2007 | Bachl et al. | 370/313 |
| 2007/0229265 A1* | 10/2007 | Takeuchi et al. | 340/572.1 |
| 2007/0291729 A1* | 12/2007 | Dalsgaard et al. | 370/347 |
| 2009/0209256 A1* | 8/2009 | Nakashima et al. | 455/436 |

OTHER PUBLICATIONS

3GPP TS 36.300 V8.1.0 (Jun. 2007); *Technical Specification*; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

* cited by examiner

*Primary Examiner* — Nay A Maung
*Assistant Examiner* — Erica Fleming-Hall
(74) *Attorney, Agent, or Firm* — Schwabe, Williamson & Wyatt, P.C.

(57) ABSTRACT

A method for determining a time of a beginning of a measurement time interval for carrying out a radio measurement, the method including receiving a message via a radio communication channel and determining the time of the beginning of the measurement time interval based on a time of the transmission of the message.

19 Claims, 5 Drawing Sheets

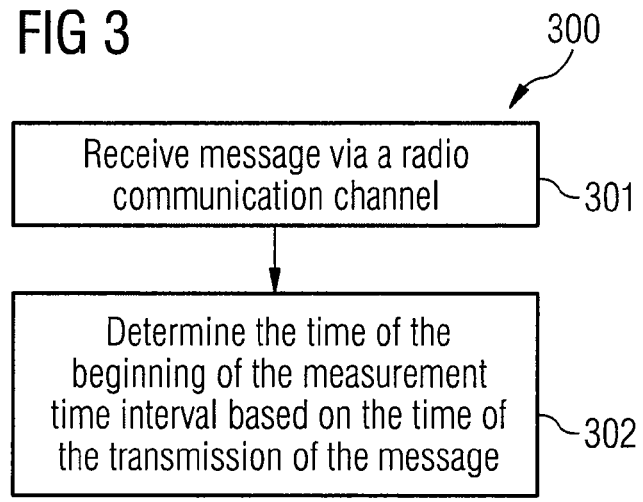
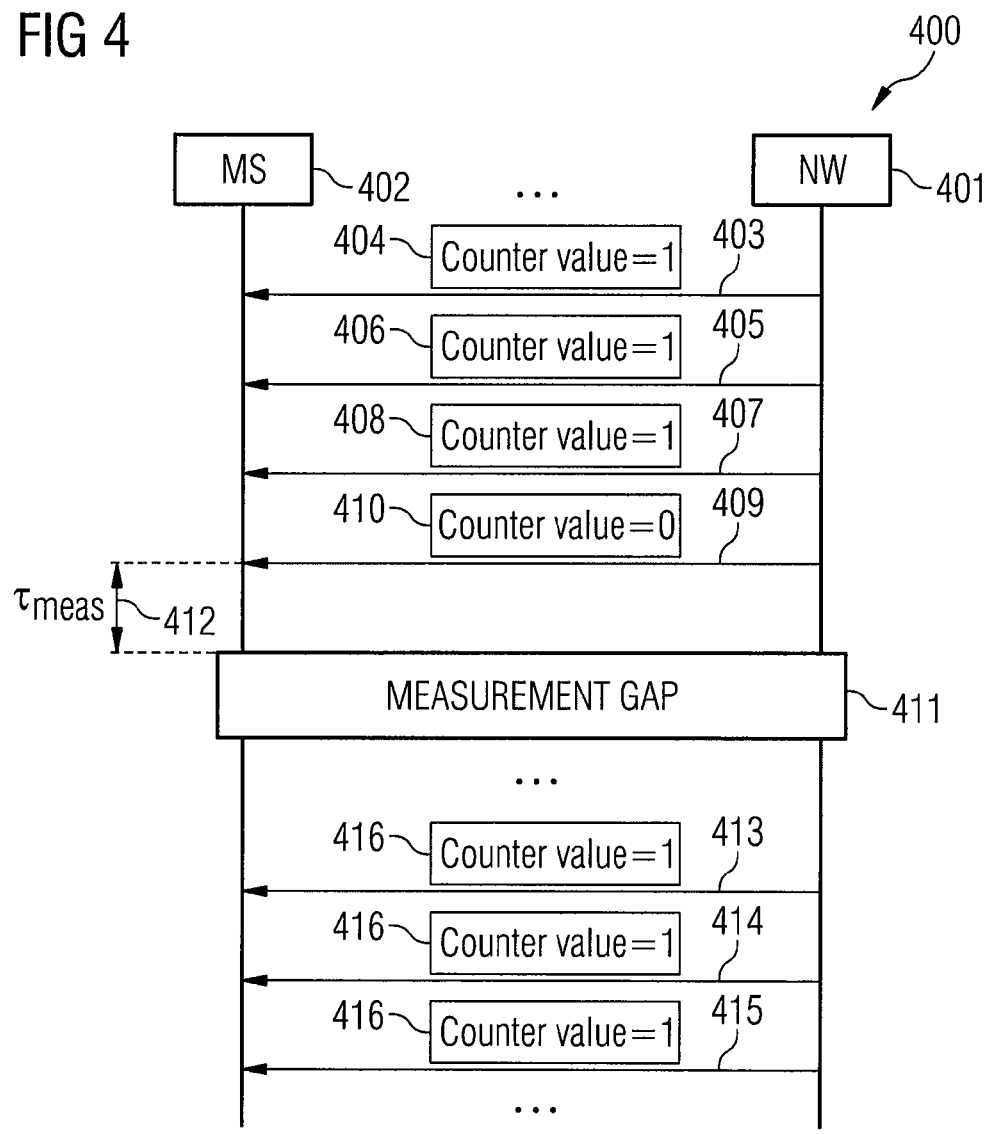

METHODS FOR SIGNALING AND DETERMINING THE TIME OF THE BEGINNING OF A MEASUREMENT TIME INTERVAL, COMMUNICATION DEVICE AND COMMUNICATION NETWORK ELEMENT

BACKGROUND

Embodiments of the invention relate generally to methods for signaling and determining the time of the beginning of a measurement time interval, a communication device and a communication network element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a flow diagram according to an embodiment of the invention;

FIG. 4 shows a message flow diagram according to an embodiment of the invention;

DESCRIPTION

Figure 1:
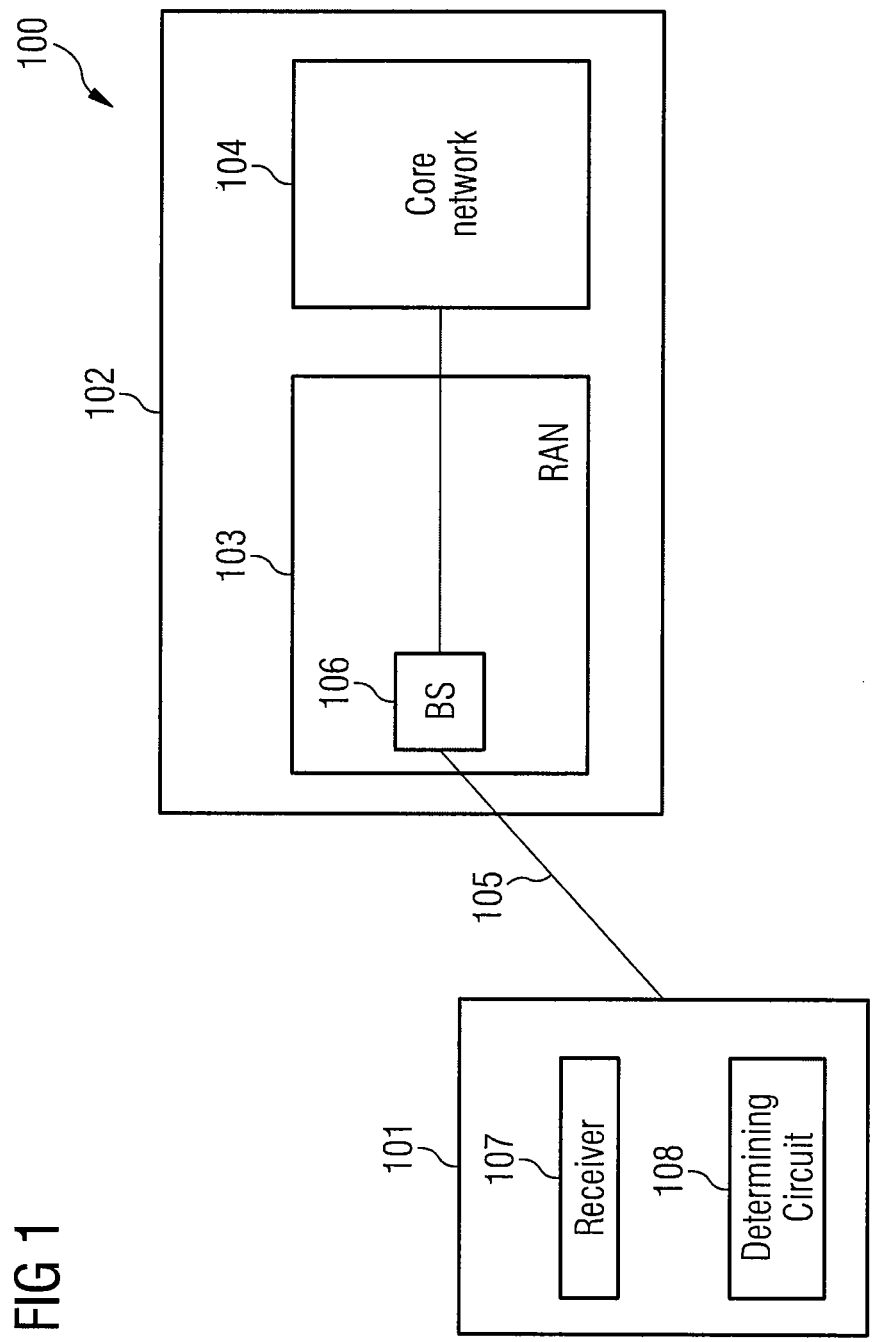
FIG. 1 shows a communication system according to an embodiment of the invention.

FIG. 1 shows a communication system 100 according to an embodiment of the invention.

The communication system 100 includes a mobile communication device 101 and a mobile communication network 102. The mobile communication network 102 includes a radio access network 103 coupled to a core network 104. The mobile communication device 101 may have a communication connection 105 to a base station 106 of the radio access network 103. In this example, the communication system 100 is a cellular mobile radio communication system, for example according to UMTS (Universal Mobile Telecommunications System), GSM (Global System for Mobile Communications), FOMA (Freedom of Mobile Access) or CDMA2000 (CDMA: Code Division Multiple Access).

In one embodiment, the communication system 100 is a mobile communication system according LTE (Long Term Evolution). LTE refers to a further development of UMTS communication systems. According to LTE, downlink data transmission is based on OFDMA (Orthogonal Frequency Division Multiple Access) and uplink data transmission is based on SC-FDMA (Single Carrier Frequency Division Multiple Access).

In the case that the communication system 100 is a mobile communication system according to LTE, the mobile communication device 101 is also called UE (User Equipment), the core network 104 is called EPC (Evolved Packet Core), the radio access network 103 is called E-UTRAN (evolved UMTS Terrestrial Radio Access Network) and the base station 106 is called eNB (evolved NodeB). The radio access network 103 and the core network 104 may be coupled via an access gateway (aGW) of the core network 104.

A current topic in the 3GPP (Third Generation Partnership Project) committee TSG RAN WG2 is the efficient signaling of control information via the LTE air interface. The aim is to reduce the amount of control information (control data) to save radio resources of the air interface and to reduce latency.

Typically, the service area of a mobile communication system such as an UMTS communication system is divided into radio cells wherein a plurality of radio cells may overlap. A mobile communication device determines the radio cell which is best for the current location of the mobile communication device. This means that the mobile communication device determines the radio cell which is operated by the base station from which radio signals can be received with the best reception quality. The mobile communication device then registers with the determined radio cell. In a UMTS communication system, the mobile communication device may select a radio cell in which the same frequency band is used for data transmission in the radio cell the mobile communication device has previously being registered or is currently registered, i.e. an intra-frequency radio cell, or it may select a radio cell that uses a different frequency band for data transmission than the one the mobile communication device has previously being registered in, i.e. select an inter-frequency radio cell, or it may select a radio cell that is part of another radio access network, for example a GSM radio access network, than the radio cell the mobile communication device has previously been or is currently registered, i.e. an inter RAT radio cell. This also applies to UMTS communication systems which are extended according to LTE.

Since the radio cell which is best for the mobile communication device may be an inter-frequency cell or an inter RAT radio cell, the mobile communication device regularly carries out measurements of the reception quality on other frequency band than the one currently used and using other radio access technologies than the one currently used, i.e. than the one used in the radio cell the mobile communication device is currently registered with. When in parallel to these measurements data is transmitted in the radio cell in which the mobile communication device is currently located the measurements may be disturbed, particularly in the case when the mobile communication device has only one receiver, for example due to reasons of costs.

Therefore, transmission gaps may be defined in which the mobile communication devices and the base station in a radio cell pause data transmission such that the mobile communication device can carry out the measurements without measurements being disturbed by data transmissions of the base station or of the mobile communication device itself.

According to UMTS, transmission gaps are for example generated using the features Compressed Mode, Discontinuous Reception, or IPDL (Ideal Periods in Downlink). According to these procedures, the mobile communication devices in a radio cell are signaled at the beginning of the data transmission, typically in course of the establishment of a communication connection, the configuration of the transmission gaps in the radio cell using a signaling message. For example, according to Compressed Mode, the signaling gaps are specified as illustrated in FIG. 2.

Figure 2:
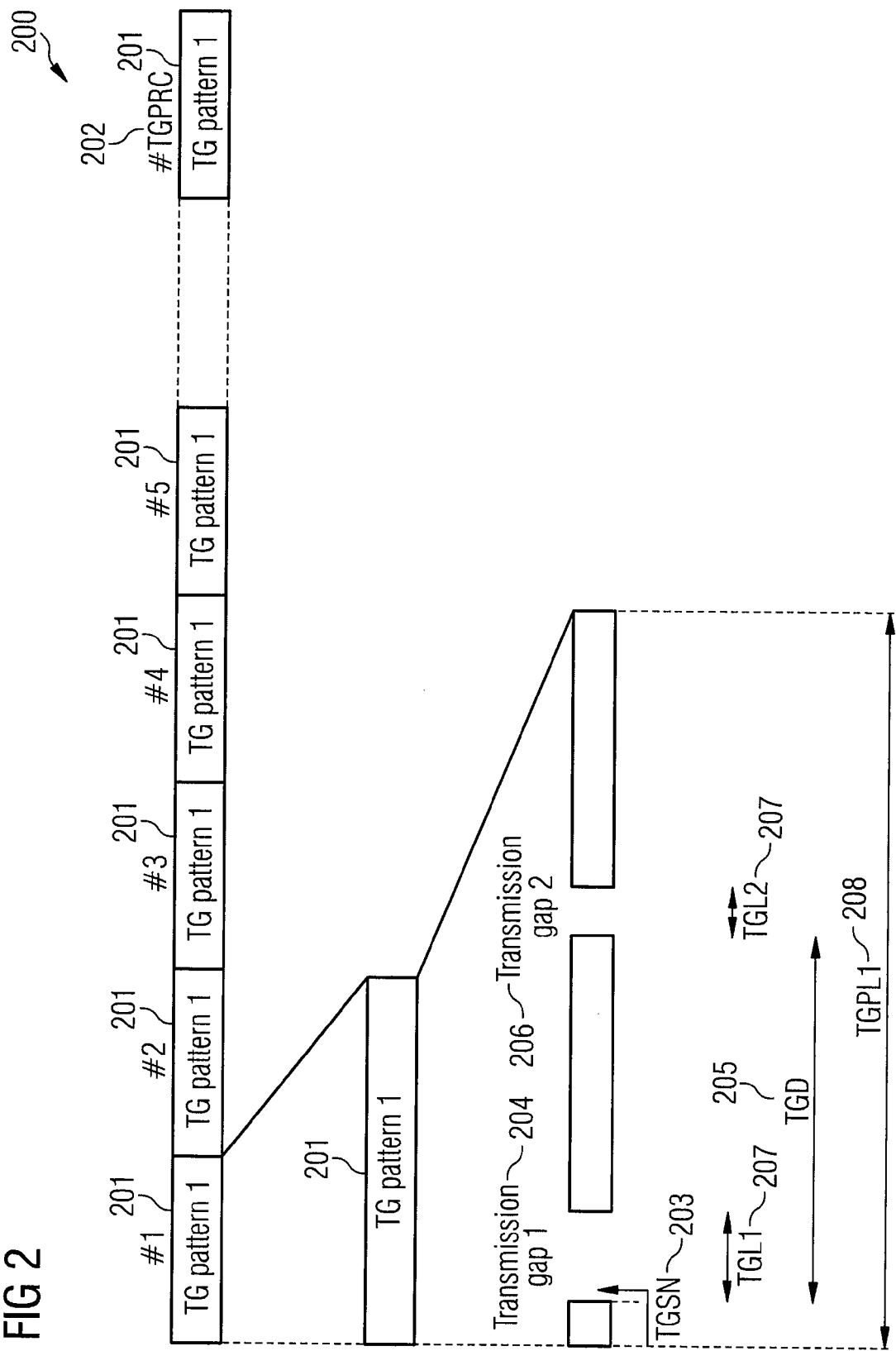
FIG. 2 shows a transmission gap pattern structure according to an embodiment of the invention.

FIG. 2 shows a transmission gap pattern structure 200 according to an embodiment of the invention.

The transmission gap pattern structure 200 includes a transmission gap pattern 201 which is periodically repeated a number of times which is specified by a first parameter 202 denoted as TGPRC (Transmission Gap Pattern Repetition Count). A second parameter 203 denoted as TGSN (Transmission Gap Starting Slot Number) specifies the number of the time slot in which the first transmission gap 204 of the transmission gap pattern 201 starts.

A third parameter, denoted as TGD (Transmission Gap Starts Distance) specifies the distance between two transmission gaps of the transmission gap pattern 201, in this example of the first transmission gap 204 and the second transmission gap 206. A fourth parameter 207 denoted as TGL (Transmission Gap Length) specifies the length of the transmission gaps 204, 206. This may be done individually for each transmission gap 204, 206. The length of transmission gap pattern 201 may be specified by a fifth parameter 208 denoted as TGPL (Transmission Gap Pattern Length).

The first parameter 202, the second parameter 203, the third parameter 205, the fourth parameter 207, and the fifth parameter 208 are for example signaled to a mobile communication device when the mobile communication device establishes a communication connection to the base station operating the radio cell in which the mobile communication device is located.

Similarly as the signaling of the scheduled times for transmission gaps as explained with reference to FIG. 2 this is done when Discontinuous Reception or IPDL are used.

The procedure described with reference to FIG. 2 for signaling transmission gaps leads to a relatively high signaling effort for the configuration of the transmission gaps. In addition, the configuration is static and therefore relatively inflexible. For example, it may not be easily and quickly adapted to the current transmission conditions in the radio cell.

Therefore, according to one embodiment of the invention the times of transmission gaps, or more generally, the times of measurement time intervals, are for example dynamically signaled.

For this, according to one embodiment of the invention, the communication device 101 includes a receiver 107 receiving a message via a radio communication channel, for example from the base station 106 via the communication connection 105. In addition, the communication device 101 includes a determining circuit 108 determining the time of the beginning of the measurement time interval for carrying out a radio measurement, for example for carrying out a measurement of the reception quality in another radio cell, based on the time of the transmission of the message.

According to one embodiment of the invention, a method for determining the time of the beginning of the measurement time interval for carrying out the radio measurement is provided and for example carried out by the communication device 101 as it is illustrated in FIG. 3.

FIG. 3 shows a flow diagram 300 according to an embodiment of the invention.

In 301, a message is received via a radio communication channel.

In 302, the time of the beginning of the measurement time interval is determined based on the time of the transmission of the message.

Illustratively, a correlation between the time of the transmission of a message for signaling the time of the beginning of a measurement time interval and the time of the beginning of a measurement time interval itself is used. In this way, information about the time of the beginning of a measurement time interval may be implicitly given by the transmission time. Thus, little signaling effort is necessary.

In one embodiment, the message further includes a value from which the time difference between the time of the beginning of the measurement time interval and the time of the transmission of the message can be calculated. For example, the time of the beginning of the measurement time interval is a pre-determined time period in addition to a time period specified by the value after the time of the transmission of the message.

In one embodiment, the time of the beginning of the measurement time interval is a pre-determined time period after the time of the transmission of the message.

For example, the message is received by a radio communication device and the measurement time interval is defined as a transmission gap of a receiver of the communication device for carrying out measurements by the receiver. The message is for example sent to the communication device by a radio communication network.

For example, the communication device is a mobile communication device and the radio communication network is a cellular mobile radio communication network.

In one embodiment, the message further includes information indicating for which radio resources of the communication network the transmission gap applies. For example it is indicated which elements of the communication network pause data transmission during the transmission gap. This may also include uplink data transmission of communication devices.

The measurement is for example the measurement of the reception quality in a radio cell. For example, the measurement is an inter frequency measurement or an inter RAT measurement.

The message may further include information indicating a type of the radio measurement to be carried out.

In one embodiment, where a communication device carries out the method illustrated in FIG. 3, a communication network may be provided carrying out a corresponding method for signaling the time of the beginning of a measurement time interval for carrying out a radio measurement. This method for example includes selecting the transmission time of a message such that the transmission time specifies, according to a pre-determined rule, the beginning of the measurement time interval and transmitting the message at the selected transmission time via a radio communication A corresponding communication network element for example includes a selecting circuit selecting the transmission time of a message such that the transmission time specifies, according to a pre-determined rule, the beginning of a measurement time interval for carrying out a radio measurement and a transmitter transmitting the message at the selected transmission time via a radio communication channel.

The pre-determined rule specifies for example how the time of the beginning of the measurement time interval is to be determined based on the time of the transmission of the message. In other words, the communication network element selects the transmission time such that a receiver of the message, e.g. a communication device, can correctly deduce the time of the beginning of the measurement time interval from the transmission time.

In one embodiment, transmission gaps are signaled, i.e. the time at which transmission gaps are scheduled, for example by the communication network 102, are signaled, by sending a counter value via a control channel to the mobile communication device 101. The mobile communication device 101 knows that when the counter value is zero that after a pre-determined time period after the transmission of the counter value a transmission gap is scheduled. A transmission gap, as explained above, is a time period in which the base station 106 operating the radio cell in which the mobile communication device 101 is currently registered and/or the mobile communication device 101 itself do not transmit data to each other.

The transmission of little amounts of data, for example the exchange of control data, may be allowed during the transmission gaps, but for example, no useful data is exchanged between the base station 106 and the mobile communication device 101 during a transmission gap.

The mobile communication network in one embodiment signals to the mobile communication device 101 that the mobile communication device 101 should use transmission gaps for inter-frequency measurements, i.e. for measurements of the reception quality in inter-frequency cells, and inter RAT measurements, i.e. for measurement of the reception quality of inter RAT radio cells. Also, the length of the transmission gaps may be signaled by the communication network 102 to the mobile communication device 101 for example according to the RRC (radio resource control) protocol used for the controlling of the resources of the radio interface of the communication system 100. This signaling may for example be carried out when the mobile communication device 101 establishes the communication connection 105 to the base station 106.

The counter value is for example transmitted via a control channel, for example via the LTE L1/2 control channel and may be received by a single mobile communication device in the radio cell, by a group of mobile radio devices in the radio cell or by all mobile radio communication devices currently registered in the radio cell.

In one embodiment, the counter value is a single bit and therefore may have two possible values. This is explained in the following with reference to FIG. 4.

FIG. 4 shows a message flow diagram 400 according to an embodiment of the invention.

The message flow takes place between a communication network 401, corresponding to the communication network 102 illustrated in FIG. 1, and a mobile communication device 402 corresponding to the mobile communication device 101 illustrated in FIG. 1.

In 403, a first message 404 is transmitted from the communication network 401 to the mobile communication device 402. The first message 404 includes the counter value 1 which does indicate to the mobile communication device 402 that a measurement gap is not scheduled in the near future. Similarly, in 405 and 407, a second message 406 and a third message 408 including the counter value 1 are transmitted from the communication network 401 to the mobile communication device 402. In 409, a fourth message 410 is transmitted by the communication network 401 to the mobile communication device 402 which includes the counter value zero. The counter value zero, in contrast to the counter value 1, indicates to the mobile communication device 402 that a measurement gap 411 is taking place after a predefined time period 412 denoted as $\tau_{meas}$. This means that the communication network 401 continues to transmit the counter value 1 and switches to the counter value 0 when a transmission gap is scheduled after the predefined time period 412. After the transmission gap 411, in 413, 414 and 415 the communication network 401 continues to transmit messages 416 including the counter value 1 until the next transmission gap is scheduled.

In another embodiment the counter value includes more than one bit and can have N possible values (with N>2). This is explained in the following with reference to FIG. 5.

Figure 5:
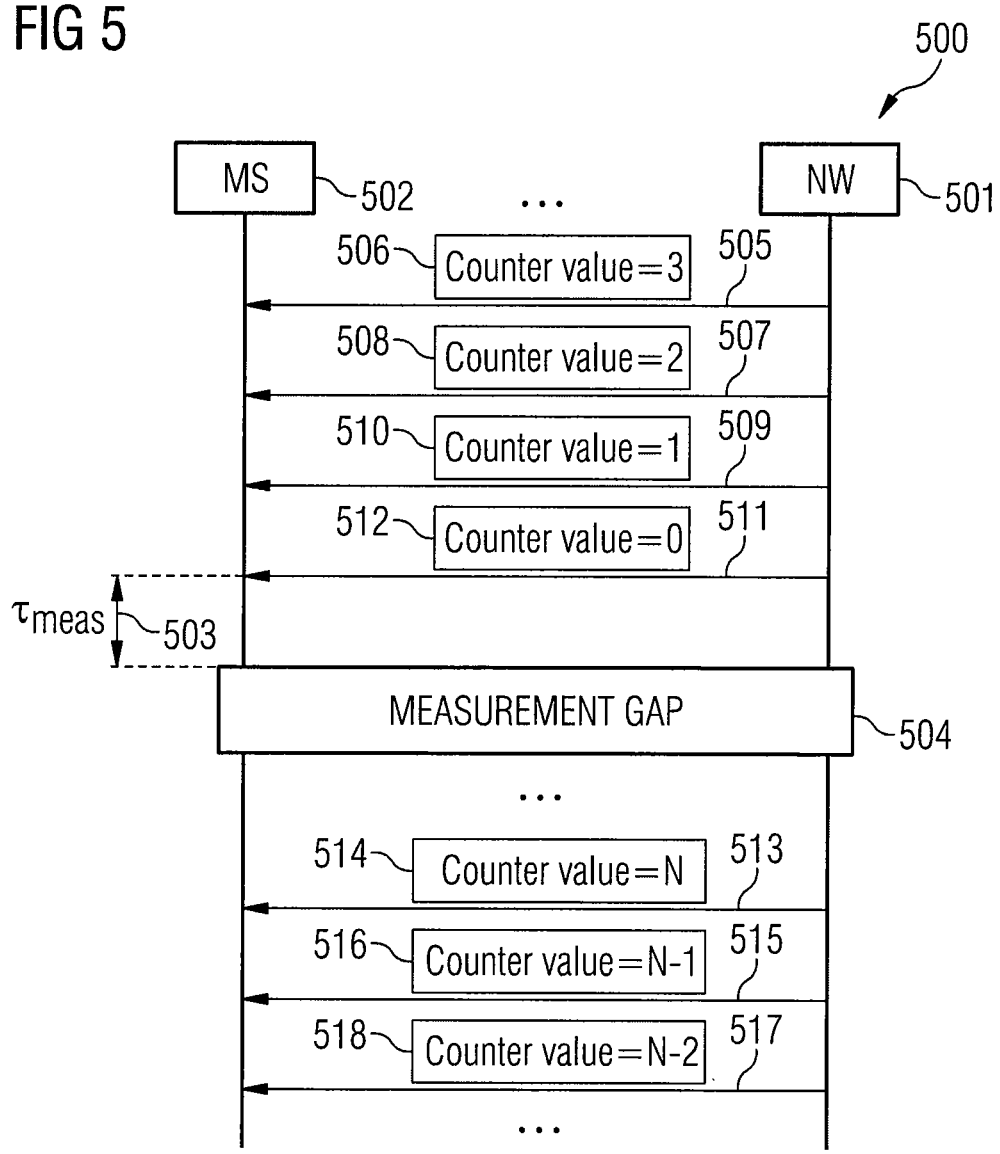
FIG. 5 shows a message flow diagram according to an embodiment of the invention.

FIG. 5 shows a message flow diagram 500 according to an embodiment of the invention.

Analogously to the message flow described with reference to FIG. 4, the message flow takes place between a communication network 501 and a mobile communication device 502.

In this embodiment, a counter value that is transmitted is decreased by one from one transmission of the counter value to the next and when the counter value zero is reached, this indicates that after a predetermined time period 503, a transmission gap 504 is scheduled. After this, the counter value is set back to the value N, for example its maximum value.

For example, in 505, the communication network 501 transmits a first message 506 to the communication device 502 including the counter value 3. In 507, the communication network transmits a second message 508 to the mobile communication device 502 including the counter value 2. In 509, the communication network transmits a third message 510 to the mobile communication device 502 including the counter value 1. In 511, the communication network 501 transmits a fourth message 512 to the mobile communication device 502 including the counter value 0. The counter value 0 indicates to the mobile communication device 502 that after the predefined time period 503 again denoted as $\tau_{meas}$ the transmission gap 504 is scheduled.

After the transmission gap the communication network 501 continues to transmit the counter value which is set back to a starting value, for example in this case the maximum value of the counter value N. Accordingly, in 513, the communication network 501 sends a fifth message 514 including the counter value N. In 515, the communication network 501 sends a sixth message 516 including the counter value N−1, in 517, the communication network 501 sends a seventh message 518 including the counter value N−2 and so on until the counter value is 0 which again indicates that after the time period 503 the next transmission gap is scheduled.

The current value of the counter can be used by the communication device 502 to estimate the time until the next transmission gap is scheduled. This means that the communication device 502 can receive one of the messages including the counter value and can, assuming that the counter value is currently sufficiently high, skip the reception of the next messages and start again with the reception of the messages including the counter values after some time when it expects that the counter value is nearing 0 which it may determine from the length of the time periods between the transmission of the messages including the counter values.

A counter having N possible value may for example indicate the time period until the beginning of a transmission gap minus the predetermined time period 503 as multiple of the length of a time slot, a sub-frame or frame. A frame structure which is for example used by the communication system 100 is illustrated in FIG. 6.

Figure 6:
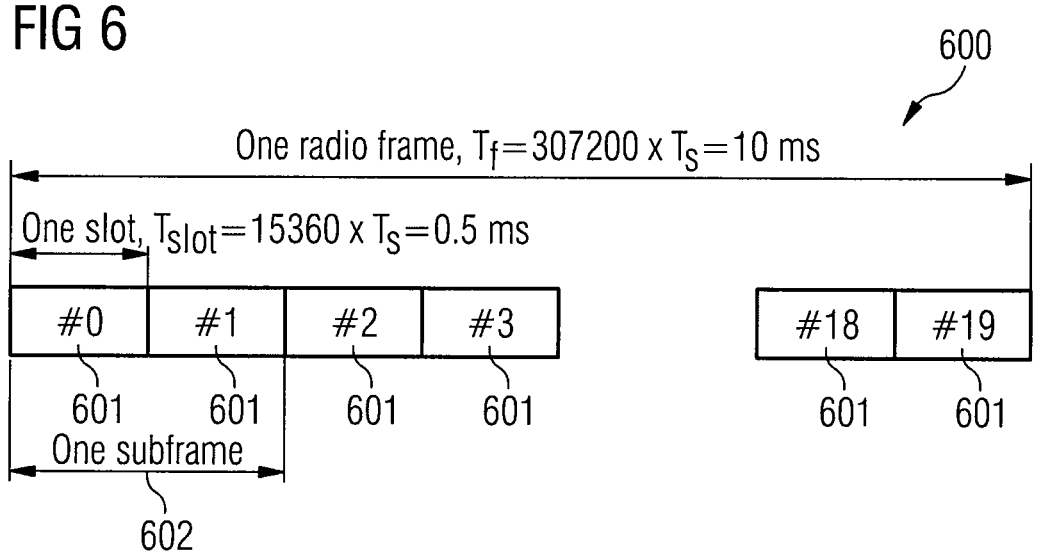
FIG. 6 shows a radio frame structure according to an embodiment of the invention.

FIG. 6 shows a radio frame structure according to an embodiment of the invention.

According to the radio frame structure shown, a radio frame 600 has a length of 10 ms and includes 20 time slots 601 each of length 0.5 ms. Every two times slots 601 may be grouped to one sub frame 602 such that the radio frame 600 includes 10 sub frames of length 1 ms.

The lengths of time slots 601, radio frames 600 and sub frames may be different from those given above in other embodiments. Further, in other embodiments, a radio frame includes not 20 time slots 601 but for example 15 time slots 601.

In the example of transmission gap patterns shown in FIG. 2, each transmission gap includes 14 time slots 601.

The counter value may for example specify the time distance between the time of transmission of the message including the counter value (for example the time of the time slot, in which the message including the counter value was transmitted) and the time of the beginning of the transmission gap minus the predefined time period 503.

Alternatively, the counter value may for example specify the time difference between the beginning of the next radio frame 600 and the time of the beginning of the transmission gap minus the predefined time period 503.

The time difference is for example specified as multiples of the length of the time slot 601. For example, if the counter value is M, this means that the next transmission gap takes place after M time slots plus the predefined time period 503 after the transmission of the message including the counter value or after the beginning of the next radio frame depending on which of the above variants is used.

In one embodiment, in addition to the counter value a control information is transmitted from the communication network 102 to the mobile communication device 101 which indicates to the mobile communication device 101 for which elements of the communication system 100 that transmission gap applies, i.e. which radio resources of the air interface are not used during the transmission gap. Examples for this are given in the following: The base station 106 with which the mobile communication device 101 is registered, i.e. operating the radio cell in which the mobile communication device 101 is registered signals that the transmission gap applies to its own downlink, i.e. the base station pauses downlink data transmission during the transmission gap;

The base station 106 signals that there is a synchronized transmission gap which applies to its own downlink data transmission and to the downlink data transmission of at least one radio cell neighboring the radio cell operated by the base station 106 which is for example selected according to a certain criterion;

The base station 106 signals that the transmission gap applies to the downlink data transmission of at least one radio cell neighboring the radio cell operated by the base station 106 and for example selected according to a certain criterion. This may be of advantage if the transmission power in the neighboring radio cell is very high and strongly contributes to the interference in the radio cell operated by the base station 106 and should not be taken into account by the mobile communication device 101 in its measurements;

The base station 106 signals that the transmission gap applies to its own downlink data transmission and signals that the transmission gap also applies to the uplink data transmission of the mobile communication device 101, i.e. that the mobile communication device 101 should synchronously with the pausing of the downlink data transmission by the base station 106 pause its uplink data transmission during the transmission gap.

In one embodiment, an information element is transmitted to the mobile communication device 101 in addition to the counter value which indicates the length and/or the purpose of the transmission gap. The indication of the purpose is for example the indication of the measurement that the mobile communication device 101 should carry out during the transmission gap for example an indication whether the mobile communication device should carry out an inter-frequency measurement or an inter RAT measurement. For example, this information element is an index or a reference to a pre-configured or pre-specified characterization of the transmission gap.

An example in which the counter includes three bits and can take values between zero and 7 is explained in the following with reference to FIG. 7.

Figure 7:
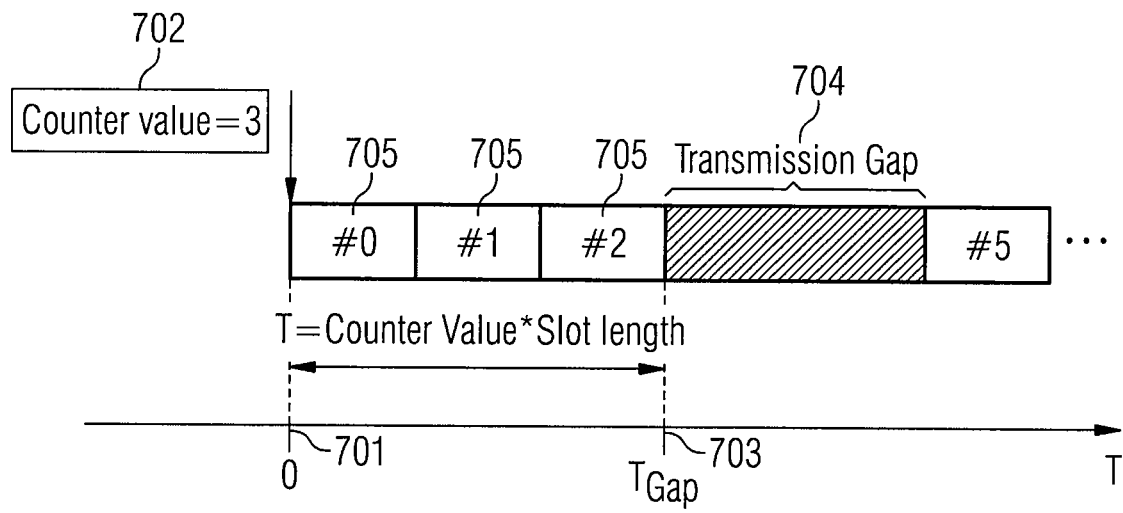
FIG. 7 illustrates the signaling of a transmission gap according to an embodiment of the invention.

FIG. 7 illustrates the signaling of a transmission gap according to an embodiment of the invention.

In this example, it is assumed for simplicity that the predefined time period $\tau_{meas}$ is 0.

At a first time 701 (time T=0) the mobile communication device 101 receives, for example via the L1/2 control channel, a message 702 including the counter value 3. From this, the mobile communication device 101 knows that after a time period 703 denoted as $T_{Gap}$ a transmission gap 704 is scheduled. The time period 703 is given by the counter value 3 times a pre-configured time interval, for example the length of a time slot. Therefore, the mobile communication device knows that the transmission gap 704 starts after three time slots 705 after the reception of the message 702.

In the transmission gap 704 the mobile communication device 101 may carry out inter-frequency or inter RAT measurements. The counter value may also specify, as mentioned above, the time difference between the beginning of the first radio frame after the radio frame in which the message 702 was received by the mobile communication device 101 and the time of the transmission gap. In this case, the time 701 is the beginning of the first radio frame after the radio frame in which the message 702 has been received by the mobile communication device 101.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for determining a time of a beginning of a measurement time interval for carrying out a radio measurement comprising:
   receiving a first message via a radio communication channel, the first message including a counter value represented by one or more bits, the counter value having a first value to indicate that no measurement time interval is scheduled by the first message;
   receiving a second message via the radio communication channel, the second message including a counter value represented by one or more bits, the counter value having a second value to indicate that the measurement time interval begins after a pre-determined time period from a time of transmission of the second message;
   receiving a third message including a counter value having a third value to indicate that the second message is estimated to be transmitted after a first time period from a time of transmission of the third message; and
   receiving a fourth message including a counter value having a fourth value to indicate that the second message is estimated to be transmitted after a second time period from a time of transmission of the fourth message, wherein the second time period is shorter than the first time period;
   determining the time of the beginning of the measurement time interval based on the counter value of the second message and on the time of transmission of the second message; and
   carrying out the radio measurement during the measurement time interval.

2. The method according to claim 1,
   wherein the second message is received by a radio communication device and the measurement time interval is defined as a transmission gap of a receiver of the communication device for carrying out measurements by the receiver.

3. The method according to claim 2,
wherein the second message is sent to the communication device by a radio communication network.

4. The method according to claim 3,
wherein the communication device is a mobile communication device and the radio communication network is a cellular mobile radio communication network.

5. The method according to claim 3,
wherein the second message comprises information indicating for which radio resources of the communication network the transmission gap applies.

6. The method according to claim 1,
wherein the measurement is a measurement of the reception quality in a radio cell.

7. The method according to claim 6,
wherein the measurement is an inter frequency measurement or an inter RAT measurement.

8. The method according to claim 1,
wherein the second message comprises information indicating a type of the radio measurement to be carried out.

9. A communication device, comprising:
a receiver to:
receive a first message via a radio communication channel, the first message including a counter value represented by a plurality of bits, the counter value having a first value to indicate that no measurement time interval is scheduled by the first message; and
receive a second message via the radio communication channel, the second message including a counter value represented by a plurality of bits, the counter value having a second value to indicate that a measurement time interval for carrying out a radio measurement begins after a pre-determined time period from a time of transmission of the second message;
receive a third message including a counter value having a third value to indicate that the second message is estimated to be transmitted after a first time period from a time of transmission of the third message; and
receive a fourth message including a counter value having a fourth value to indicate that the second message is estimated to be transmitted after a second time period from a time of transmission of the fourth message, wherein the second time period is shorter than the first time period
a determining circuit to determine a time of a beginning of the measurement time interval based on the counter value of the second message and on the time of transmission of the second message; and
a measurement circuit to carry out the radio measurement during the measurement time interval.

10. A method for signaling a time of a beginning of a measurement time interval for carrying out a radio measurement, the method comprising:
transmitting a first message to a communication device, the first message including a counter value represented by one or more bits, the counter value having a first value to indicate that no measurement time interval is scheduled by the first message;
selecting a transmission time of a second message;
transmitting a third message to the communication device, the third message including a counter value having a third value to indicate that the second message is estimated to be transmitted after a first time period from a time of transmission of the third message; and transmitting a fourth message to the communication device, the fourth message including a counter value having a fourth value to indicate that the second message is estimated to be transmitted after a second time period from a time of transmission of the fourth message, wherein the second time period is shorter than the first time period;
generating the second message, the second message including one or more bits to represent a counter value, the counter value having a second value to indicate that the beginning of the measurement time interval occurs after a pre-determined time period from the transmission time of the second message; and
transmitting the second message at the selected transmission time via a radio communication channel to control the communication device to carry out the radio measurement during the measurement time interval.

11. The method according to claim 10,
wherein the second message is transmitted to the communication device and the measurement time interval is defined as a transmission gap of a receiver of the communication device for carrying out measurements by the receiver.

12. The method according to claim 11,
wherein the message is sent to the communication device by a radio communication network.

13. The method according to claim 12,
wherein the communication device is a mobile communication device and the radio communication network is a cellular mobile radio communication network.

14. The method according to claim 12,
wherein the second message comprises information indicating for which radio resources of the communication network the transmission gap applies.

15. The method according to claim 10,
wherein the measurement is a measurement of reception quality in a radio cell.

16. The method according to claim 15,
wherein the measurement is an inter frequency measurement or an inter RAT measurement.

17. The method according to claim 10,
wherein the second message comprises information indicating a type of the radio measurement to be carried out.

18. A communication network element, comprising:
a transmitter to transmit a first message to a communication device, the first message including one or more bits to represent a counter value, the counter value having a first value to indicate that no measurement time interval is scheduled by the first message; and
a selecting circuit to select a transmission time of a second message, wherein the second message includes one or more bits to represent a counter value, wherein the counter value of the second message has a second value to indicate that a beginning of a measurement time interval occurs after a pre-determined time period from the transmission time of the second message;
wherein the transmitter is further to:
transmit the second message at the selected transmission time via a radio communication channel to control the communication device to carry out the radio measurement during the measurement time interval;
transmit a third message to the communication device, the third message including a counter value having a third value to indicate that the second message is estimated to be transmitted after a first time period from a time of transmission of the third message; and transmit a fourth message to the communication device, the fourth message including a counter value having a fourth value to indicate that the second message is estimated to be transmitted after a second time period from a time of transmission of the fourth message, wherein the second time period is shorter than the first time period.

19. A communication device, comprising:

a receiving means for:
- receiving a first message via a radio communication channel, the first message including one or more bits to represent a counter value having a first value to indicate that no measurement time interval is scheduled by the first message;
- receiving a second message via the radio communication channel, the second message including one or more bits to represent a counter value having a second value to indicate that a time of a beginning of a measurement time interval for carrying out a radio measurement occurs after a pre-determined time period from a time of transmission of the second message;
- receiving a third message including a counter value having a third value to indicate that the second message is estimated to be transmitted after a first time period from a time of transmission of the third message; and
- receiving a fourth message including a counter value having a fourth value to indicate that the second message is estimated to be transmitted after a second time period from a time of transmission of the fourth message, wherein the second time period is shorter than the first time period a determining means for determining the time of the beginning of a measurement time interval based on the counter value of the second message and on the time of the transmission of the second message; and a measurement means for carrying out the radio measurement during the measurement time interval.

\* \* \* \* \*